June 1, 1965  J. FREDERICK  3,186,460
STRAW CHOPPING APPARATUS
Filed July 20, 1961
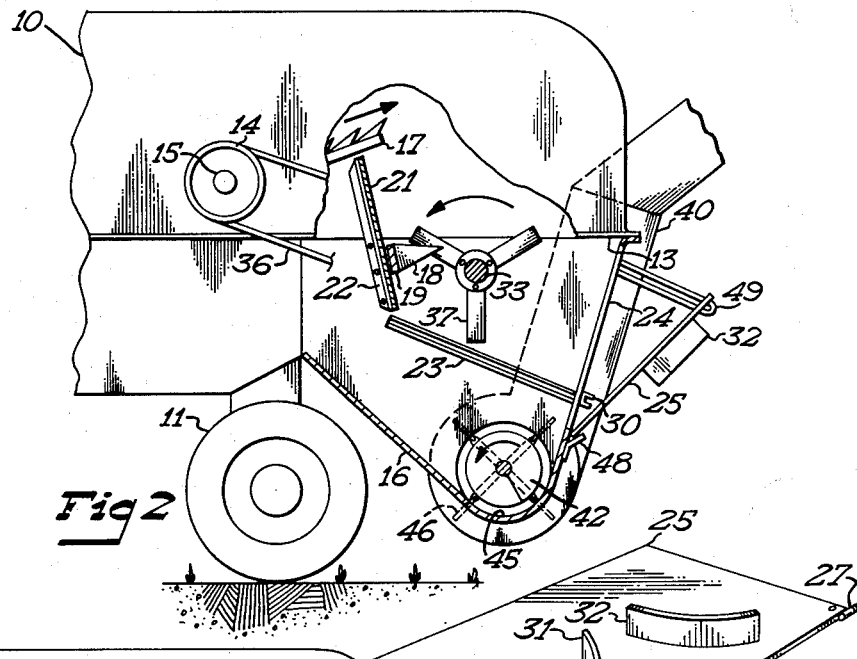
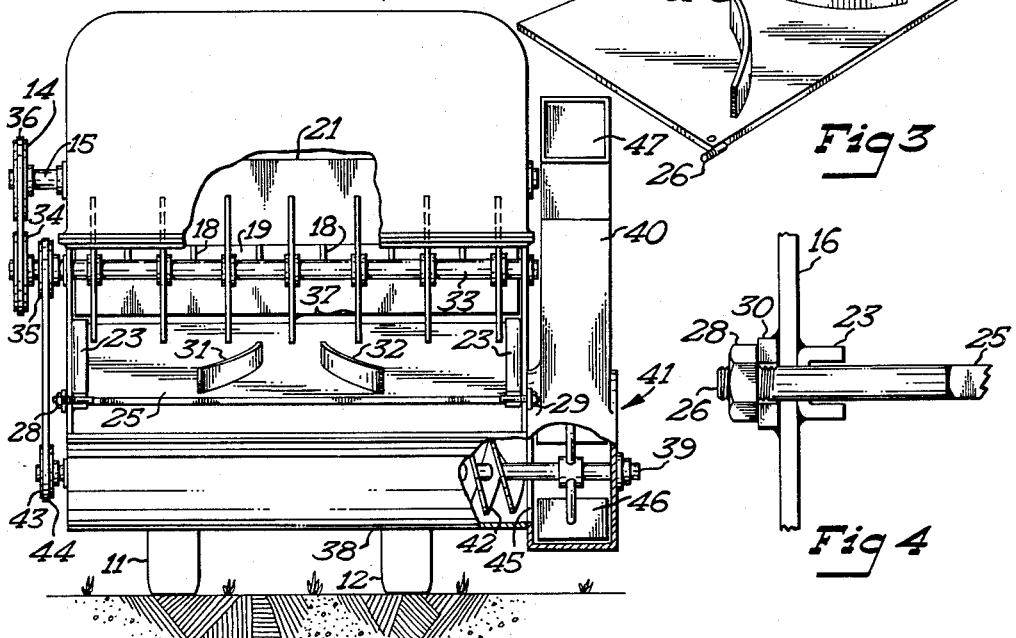
INVENTOR.
JOSEPH FREDERICK
BY
Everett J. Schroeder
Kenneth D. Siegfried
HIS ATTORNEYS

3,186,460
STRAW CHOPPING APPARATUS
Joseph Frederick, Box 77, Richardton, N. Dak.
Filed July 20, 1961, Ser. No. 125,487
2 Claims. (Cl. 146—117)

This invention relates to the field of farm implements and more particularly to straw chopping apparatus to be used with a combine.

Numerous methods have been devised to dispose of the straw which is spread over a field after it has been combined. The main objection in leaving the straw on the field generally is that the straw is discharged from the combine in lengths which make it somewhat hard to dispose of. Furthermore, the main objection to discharging the straw and chaff or inert matter upon the field is that the inert matter or chaff may contain weed seeds which are then distributed over the field to create an additional problem of weed control. Therefore, a method of containing the inert matter or weed seeds from the combine and discharging the straw in small chopped segments has specific advantages in the harvesting operation.

My invention is a straw chopping apparatus that may be attached to a combine to chop the straw into small segments and also discharge the weed seeds or inert matter through a separate discharge means or if it is wished to contain both the straw and inert matter in the same general area upon being discharged, this may also be accomplished.

It is therefore a general object of the present invention to provide improved straw chopping apparatus.

It is another object of the present invention to provide novel straw chopping apparatus adaptable to be attached to a combine.

It is yet another object of the present invention to provide novel and improved means for chopping the straw and discharging the straw separately from the inert matter.

It is yet another object of this invention to provide novel and improved means for chopping and discharging the straw and inert matter through the means of a conveyor.

It is still a further object of this invention to provide novel and improved means for chopping and discharging both straw and inert matter using a conveyor and blower.

It is yet another object of the present invention to provide novel and improved chopping means having removable partition walls to control the means for discharging the chopped straw.

It is yet another object of this invention to provide novel and improved chopping means having a removable partition which may be readily attached in a plurality of positions to the chopping means to produce the desired function.

It is still a further object of the present invention to provide a new and improved chopping means having additional means to aid in distributing the straw in rows upon the ground after being chopped.

It is still a further object of the present invention to provide novel and improved means for discharging the straw and inert matter through the same conveying and blower means while controlling the air flow through the blower.

It is another object of the present invention to provide new and improved chopping means which is attached to a combine and driven by the combine power apparatus.

These and other objects and features of my invention will become more apparent from the detailed description set forth in the specification and drawings where similar reference characters designate corresponding parts and in which:

FIG. 1 is a rear view of the combine with parts broken away and with the straw chopping apparatus attached thereto;

FIG. 2 is a side view having a portion of the combine and chopper housing broken away to show the internal structure and placement of parts;

FIG. 3 is a perspective view of a partition plate showing a curved bracket means attached thereto for aiding in distributing the straw in rows upon the ground; and FIG. 4 is a detailed view of one means of attaching the plate shown in FIG. 3 to the chopper housing as seen in FIG. 1.

The combine 10 is shown in partial section in FIGS. 1 and 2 and is supported by a pair of wheels 11 and 12. Combine 10 has a discharge opening 13 to which straw and inert matter is generally discharged from the combine. A power driven pulley 14 is supported by a shaft 15 for rotation and shaft 15 is driven by the power source (not shown) which supplies power to the combine. The straw chopping apparatus is contained in a housing 16 which is attached to combine 10 at the discharge opening 13 so that any straw or inert matter such as weed seeds or chaff is deposited in housing 16 after being discharged from the combine. The combine straw walkers 17 cause the straw to be shuffled rearwardly so that the straw is dropped through discharged opening 13. Straw walkers 17 are operated in the normal fashion and their operation is generally well known to those skilled in the art, it being sufficient to say that they provide a reciprocating motion to urge the straw rearwardly.

Situated near the forward and upper edge of housing 16 are a plurality of triangular shaped fixed knives 18 having their cutting edges facing upward and which are fastened to a rigid bar 19 so that they are supported laterally across the housing 16. That is, knives 18 are placed directly below the discharge opening 13 of combine 10 so that any straw discharged from walkers 17 will normally fall across and upon the cutting edges of knives 18. Extending forward, above, and below bar 19 and knives 18, is a partition 21 which is generally formed of some sheet metal and is supported at its sides by a pair of angle brackets 22 (only one of which is shown), and is suitably attached to the side walls of housing 16 by sheet metal screws or bolts. It will be noted that partition 21 extends upwardly in front of knives 18 so that it terminates at its upper edge just below walkers 17 and terminates at its bottom edge so that it joins with the extreme inward end of a pair of guide ways or guides 23. A further explanation will be given for the use of partition 21 later. Guides 23 are fastened to the edges of housing 16 with the innermost end situated below partition 21 and extending downwardly and outwardly towards an opening 24 in the rear portion of housing 16. Guides 23 terminate just above the lower edge of the opening 24 in housing 16. Guides 23 are U shaped members which are fastened to the edge of housing 16 so that they may receive a plate 25 which also is generally constructed of sheet metal or any other suitable material which will span the distance between the two outer edges of the chopper housing 16 without appreciably buckling. Plate 25 also has a pair of rods 26 and 27 which contain threads on which a pair of nuts 28 and 29 are threaded. Rods 26 and 27 each engage a slotted bracket 30, the detail of which may be seen in FIG. 4. Also riveted or welded or fastened through other suitable means, to plate 25, is a pair of curved brackets 31 and 32 which are situated on the uppermost or top side of plate 25 as seen in FIG. 1. Brackets 31 and 32 curve outwardly towards the edges from the central position of plate 25 and their purpose and usefulness will be described later.

A shaft 33 is rotatably supported by a pair of bearings housed in a pair of bores on the two side panels of housing 16 near the uppermost edge of housing 16 and rearwardly from knives 18. Situated on one end of shaft 33 is a pair of pulleys 34 and 35. A belt or chain 36 connects pulleys 14 and 34 together so that power is transmitted from shaft 15 to shaft 33. A plurality of knives 37 are equally spaced along shaft 33 and are situated so that they rotate between fixed knives 18 and thereby cut the straw falling across knives 18. Knives 37 are shown to be made in three sections which are spaced 120° apart, but it will become apparent to those skilled in the art that knives of different configurations may be used to achieve the optimum results. It may also be seen that the knife blades may be removably attached to a collar or other structure which is placed around shaft 33 to support knives 37. From FIG. 1, it will be seen that as the straw is discharged from walkers 17, that it will fall upon fixed knives 18 or rotating knives 37 and be carried into a cutting relation with knives 18 so that the straw is cut into small segments. Partition 21 merely directs the straw which falls from straw walker 17 towards knives 18 and 37 to insure that the straw is chopped and does not fall directly to the bottom of housing 16.

Located in the bottom of housing 16, and below opening 24 is a conveyor 38 and for this particular application is of the auger type. It should be noted that the forward and rearward sides of housing 16 are diagonally sloped downward towards conveyor 38 so that the straw and inert matter is directed towards or into conveyor 38. A shaft 39 is suitably journalled in housing 16 and in the outer housing 40 of a blower 41 which is attached to the side of housing 16. Shaft 39 supports the auger blades 42 which convey the inert material and straw from left to right as seen in FIG. 1. Situated at the end of shaft 39 is a pulley 43 which is driven by pulley 35 through a belt or chain 44 to cause auger blades 42 to be rotated. A circular hole 45 is located in the side of housing 16 adjacent lower housing 40 so that materials may be conveyed into lower housing 40. A plurality of fan blades 46 are coupled to shaft 39 which rotates fan blades 46 to cause the inert materials and chopped straw to be discharged through an opening 47 of housing 40.

When plate 25 is not used internally in guides 23, it is used to cover opening 24 in the rear portion of housing 16 and this is accomplished by urging the bottom edge of plate 25 into a V type slot formed by housing 16 and a bracket 48 which is fixedly secured to housing 16 below opening 24, and the upper edge of plate 25 is supported by a pair of brackets 49 (there being only one shown). Bracket 49 has an elongated cutout portion to form a long slot into which rods 27 and 26 are situated and suitable means such as nuts 28 or a wing nut may be fastened on the outer side of bracket 49 to secure plate 25 to housing 16. Since the angle made between housing 16 and plate 25 is adjustable, the amount of air which is allowed to enter opening 24 is also adjusted so that the air flow to blower 41 is controlled to provide optimum operation of blower 41.

In the operation of my invention, where it is desirable to discharge the straw upon the ground and keep it separated from the inert matter and weed seeds, this may be accomplished by placing plate 25 in guides 23 and securing plate 25 to brackets 30. Upon the straw being discharged from walkers 17, the straw then falls across knives 18 or 37 and is cut by the cooperating relationship of the stationary and rotating knives so that the chopped straw is allowed to fall upon plate 25 and be discharged through opening 24. If it is desirable to form the chopped straw in rows upon the ground, plate 25 is inserted in guides 23 so that brackets 31 and 32 are facing downwardly thereby directing the chopped straw into rows upon the ground. If it is wished to spread the straw across the ground as the combine moves across the field, plate 25 may be inserted with brackets 31 and 32 facing upwardly so that the straw is widely spread through opening 24 to fall upon the ground. While this operation is taking place, the weed seeds and other inert matter is deposited along the bottom sloping edge of housing 16 to fall into conveyor 38 and be conveyed to blower 41 and thereby be blown out discharge opening 47 where it may be confined to a trailer or some other suitable means to catch the undesirable weed seed and inert matter.

However, if it is the desire of the operator to chop the straw into small segments and then discharge the straw along with the inert matter, this is accomplished by placing plate 25 in the groove formed by bracket 48 and housing 16 and held in position by bracket 49 at its upward portions so that opening 24 is substantially closed. In this manner of operation, the straw is chopped and dropped into conveyor 38 where the auger blades 42 convey the chopped materials along with the inert matter through opening 45 into lower housing 41 where the blades 46 force the inert matter and the chopped straw through discharge opening 47. By adjusting the opening between housing 16 and plate 25, the air flow pressure may be increased or decreased depending upon the moisture content of the straw to be chopped and discharged so that an optimum operating point may be achieved. In this mode of operation all of the chopped straw and inert matter or weed seeds are conveyed and blown out through discharge opening 47 to some suitable means for containing the straw and inert matter.

While I have not shown the power means for driving my device, it is generally not anticipated that auxiliary power is needed to drive the chopper but if for any reason it is necessary to add additional power, it is contemplated that such a practice may be embodied in my invention.

While I have shown a particular embodiment of my invention, I intend to cover all modifications, variations, and changes which may be made by those skilled in the art, in the appended claims and intend to be limited only by the spirit and scope of these claims.

What is claimed is:

1. A straw chopping apparatus to be used in combination with a combine comprising: a power driven combine for combining crops having straw walkers and a discharge opening below said straw walkers for discharging straw and inert matter; a housing having top, rear, and side openings therein attached to said combine with said top opening under said discharge opening for receiving said straw and inert matter from said combine; a plurality of knives attached laterally across said housing at a forward position such that straw is discharged thereacross; a shaft rotatably supported in said housing having a plurality of knives fixedly attached thereto to cooperate with said knives attached to said housing and rotate therebetween so that said straw is chopped into small segments; first power transfer apparatus connected between said first shaft and said power driven combine to provide rotational power for said first shaft; a pair of plate guideways extending forwardly and upwardly from said rear opening located in and being fixedly attached to the side walls of said housing; a plate adapted to slide in said guideways including means for securing said plate in said guideways to cause said chopped straw to be discharged through said rear openings; a partition extending substantially in a vertical direction, both above and below said knives attached to said housing to terminate below said walkers and above said guideways; a blower attached to said housing at said side opening to draw said inert matter into said blower and discharge it therefrom; and second power transfer apparatus connected between said blower and said first shaft to provide rotational power for said blower.

2. A straw chopping apparatus to be used in combination with a combine comprising: a power driven combine for combining crops having straw walkers and a discharge opening below said straw walkers for discharging straw and inert matter; a housing having top, rear, and side openings therein, said top opening mating with said discharge opening for receiving said straw and inert matter from said combine; a chopper having a plurality of knives fixedly attached laterally across said housing at a forward location and a plurality of knives rotatably supported in said housing to cooperate with said knives fixedly attached to said housing and rotating therebetween to receive said straw thereacross so that said straw is chopped into small segments; a plate disposed below said chopper and extending forwardly and upwardly from said rear opening and being releasably attached to the side walls of said housing to cause said chopped straw to be discharged through said opening, said plate having attached thereto a pair of brackets curved outwardly towards the edges of said plate and downwardly towards said rear opening to aid in spreading said straw after passing through said rear opening; a blower attached to said housing at said side opening to draw said inert matter into said blower and discharge it therefrom; a partition attached to said housing and extending substantially downward below said walkers and above said plate to aid in guiding said straw into said chopper and said inert matter into said blower; and an auger type conveyor connected to said blower and located in the bottom of said housing to receive and convey said inert matter to said blower.

References Cited by the Examiner

UNITED STATES PATENTS

| | | | |
|---|---|---|---|
| 1,991,757 | 2/35 | Lorentz | 146—117 |
| 2,609,929 | 9/52 | King | 130—24 XR |
| 2,701,595 | 2/55 | Berger et al. | |
| 2,862,536 | 12/58 | Gronberg | 146—117 |

FOREIGN PATENTS

| | | |
|---|---|---|
| 843,617 | 7/52 | Germany. |
| 657,437 | 9/51 | Great Britain. |

J. SPENCER OVERHOLSER, *Primary Examiner.*

CARL W. ROBINSON, *Examiner.*